US012562459B2

(12) United States Patent
Choi et al.

(10) Patent No.: US 12,562,459 B2
(45) Date of Patent: Feb. 24, 2026

(54) ANTENNA DEVICE AND DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); In Kak Song, Jeollabuk-do (KR); So Eun Jang, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 251 days.

(21) Appl. No.: 18/098,317

(22) Filed: Jan. 18, 2023

(65) Prior Publication Data

US 2023/0216178 A1 Jul. 6, 2023

Related U.S. Application Data

(63) Continuation of application No. PCT/KR2021/009030, filed on Jul. 14, 2021.

(30) Foreign Application Priority Data

Jul. 21, 2020 (KR) ........................ 10-2020-0090448

(51) Int. Cl.

| | |
|---|---|
| ***H01Q 1/24*** | (2006.01) |
| ***H01Q 1/36*** | (2006.01) |
| ***H01Q 1/38*** | (2006.01) |
| ***H01Q 9/04*** | (2006.01) |
| *H01Q 1/50* | (2006.01) |

(52) U.S. Cl.

CPC ............. *H01Q 1/243* (2013.01); *H01Q 1/364* (2013.01); *H01Q 1/38* (2013.01); *H01Q 9/045* (2013.01); *H01Q 1/50* (2013.01)

(58) Field of Classification Search

CPC .......... H01Q 1/243; H01Q 1/364; H01Q 1/38; H01Q 1/50; H01Q 9/045

See application file for complete search history.

(56) References Cited

U.S. PATENT DOCUMENTS

2016/0190678 A1* 6/2016 Hong ........................ H01Q 1/44
343/700 MS
2021/0135340 A1* 5/2021 Kim ........................ H01Q 1/245

(Continued)

FOREIGN PATENT DOCUMENTS

CN 111009723 A 4/2020
CN 215869801 U 2/2022

(Continued)

OTHER PUBLICATIONS

International Search Report for PCT/KR2021/009030 mailed on Nov. 24, 2021.

(Continued)

*Primary Examiner* — Amal Patel

(74) *Attorney, Agent, or Firm* — The PL Law Group, PLLC

(57) ABSTRACT

An antenna device according to an aspect includes a dielectric layer, a radiator formed on the dielectric layer, and a transmission line connected to the radiator on the dielectric layer and formed in a mesh structure which is a set of unit cells defined by a plurality of conductive lines. A width of the transmission line may be an integer multiple of the width of the unit cell, and may be within an allowable error range.

8 Claims, 8 Drawing Sheets

(56) References Cited

U.S. PATENT DOCUMENTS

| | | | | |
|---|---|---|---|---|
| 2021/0358996 | A1* | 11/2021 | Lee | H01Q 1/243 |
| 2022/0278445 | A1* | 9/2022 | Woo | H01Q 9/045 |

FOREIGN PATENT DOCUMENTS

| | | | |
|---|---|---|---|
| JP | 2015-097358 | A | 5/2015 |
| KR | 10-2009-0072100 | A | 7/2009 |
| KR | 10-2013-0095451 | A | 8/2013 |
| KR | 10-2016-0036436 | A | 4/2016 |
| KR | 10-2016-0080444 | A | 7/2016 |
| KR | 10-2019-0105812 | A | 9/2019 |
| KR | 10-2020-0010906 | A | 1/2020 |
| KR | 10-2082485 | B1 | 2/2020 |
| WO | WO 2017/115641 | A1 | 7/2017 |
| WO | WO 2019/143190 | A1 | 7/2019 |
| WO | WO 2019/172611 | A1 | 9/2019 |

OTHER PUBLICATIONS

Office action issued on Feb. 4, 2025 from Japan Intellectual Property Office in a counterpart Japanese Patent Application No. 2023-503446 (all the cited references are listed in this IDS.) (English translation is also submitted herewith. ).

Office action issued on Dec. 19, 2024 from China Patent Office in a counterpart China Patent Application No. 202110824964.8 (English translation is also submitted herewith.).

* cited by examiner (a) Example 1

(b) Comparative Example 1

(b) Comparative Example 2

(a) Example 2

(b) Comparative Example 3

(b) Comparative Example 4

ANTENNA DEVICE AND DISPLAY DEVICE INCLUDING THE SAME

CROSS-REFERENCE TO RELATED APPLICATION AND CLAIM OF PRIORITY

This application is a continuation application to International Application No. PCT/KR2021/009030 with an International Filing Date of Jul. 14, 2021, which claims the benefit of Korean Patent Application No. 10-2020-0090448 filed on Jul. 21, 2020 at the Korean Intellectual Property Office, the disclosure of which are incorporated by reference herein in their entirety.

BACKGROUND

1. Field

The present invention relates to an antenna device and a display device including the same.

2. Description of the Related Art

Recently, according to development of the information-oriented society, wireless communication techniques such as Wi-Fi, Bluetooth, and the like are implemented, for example, in a form of smartphones by combining with display devices. In this case, an antenna may be coupled to the display device to perform a communication function.

Recently, with mobile communication techniques becoming more advanced, it is necessary for an antenna for performing communication in high frequency or ultra-high frequency bands to be coupled to the display device. In addition, according to development of thin, high-transparency and high-resolution display devices such as a transparent display and a flexible display, it is necessary to develop an antenna so as to also have improved transparency and flexibility.

As the size of a screen in the display device is increased, a space or area of a bezel part or light-shielding part has been decreased. In this case, the space or area in which the antenna can be embedded is also limited, and thereby, a radiator included in the antenna to transmit and receive signals may be overlapped with a display region of the display device. Accordingly, an image of the display device may be hidden by the radiator of the antenna or the radiator may be viewed by a user, thereby causing a deterioration in image quality.

Therefore, it is necessary to design an antenna for implementing high-frequency communication with a desired antenna gain in a limited space without being viewed by the user.

SUMMARY

It is an object of the present invention to provide an antenna device and a display device including the same.

To achieve the above objects, the following technical solutions are adopted in the present invention.

1. An antenna device including: a dielectric layer; a radiator formed on the dielectric layer; and a transmission line connected to the radiator on the dielectric layer and formed in a mesh structure which is a set of unit cells defined by a plurality of conductive lines, wherein a width of the transmission line is an integer multiple of a width of the unit cell, and is within an allowable error range.

2. The antenna device according to the above 1, wherein the width of the transmission line satisfies Equation 1 below:

$$(n-0.2)\times b \leq a \leq (n+0.2)\times b \qquad \text{[Equation 1]}$$

wherein, n is an integer, b is the width of the unit cell, and a is the width of the transmission line.

3. The antenna device according to the above 1, further including: a signal pad connected to an end of the transmission line; and a ground pad disposed around the signal pad so as to be separated from the signal pad.

4. The antenna device according to the above 3, wherein the signal pad or the ground pad is formed in a solid structure.

5. The antenna device according to the above 3, wherein the ground pad includes a pair of ground pads facing each other with the signal pad interposed therebetween.

6. The antenna device according to the above 1, further including a dummy pattern disposed around the radiator and the transmission line on the dielectric layer with being electrically separated therefrom.

7. The antenna device according to the above 6, wherein the radiator and the dummy pattern are formed in a mesh structure.

8. The antenna device according to the above 1, further including a ground layer formed on a lower surface of the dielectric layer.

According to embodiments of the present invention, by determining the width of the transmission line in consideration of the width of the unit cell forming the mesh structure, signal loss in the transmission line where a flow of current is concentrated during supplying a power may be prevented, and thereby antenna gain may be improved.

DETAILED DESCRIPTION

Figure 1:
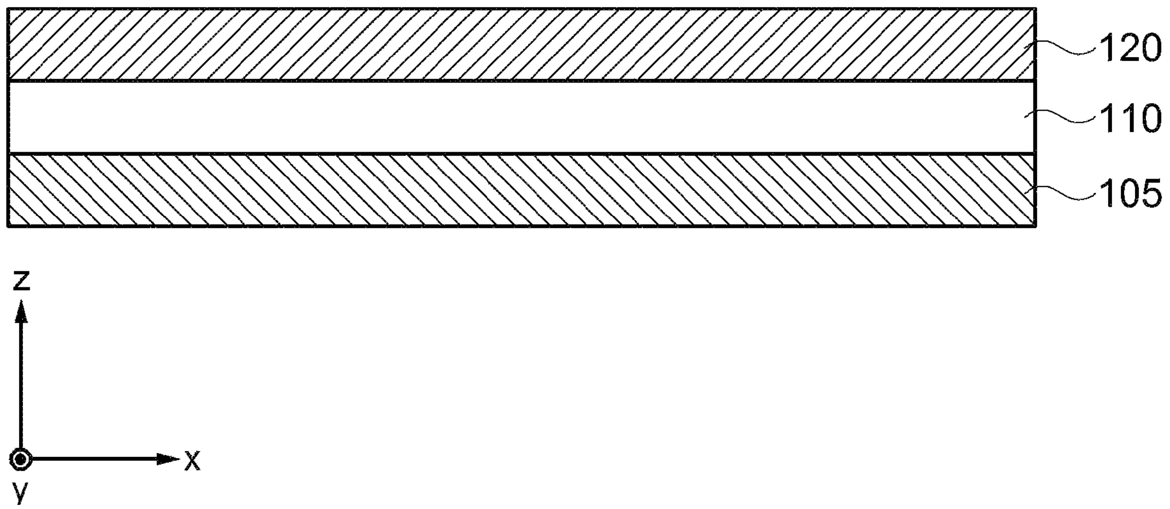
FIG. 1 is a schematic cross-sectional view illustrating an antenna device according to an embodiment.

Hereinafter, embodiments will be described in detail with reference to the accompanying drawings. In denoting reference numerals to components of respective drawings, it should be noted that the same components will be denoted by the same reference numerals although they are illustrated in different drawings.

In description of preferred embodiments of the present invention, the publicly known functions and configurations that are judged to be able to make the purport of the present invention unnecessarily obscure will not be described in detail. Further, wordings to be described below are defined in consideration of the functions of the embodiments, and may differ depending on the intentions of a user or an operator or custom. Accordingly, such wordings should be defined on the basis of the contents of the overall specification.

It will be understood that, although the terms first, second, etc. may be used herein to describe various elements or components, these elements or components should not be limited by these terms. As used herein, the singular forms “a,” “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements, components and/or a combination thereof, but do not preclude the presence or addition of one or more other features, integers, steps, operations, elements, components, and/or a combination thereof.

Further, directional terms such as “one side,” “the other side,” “upper,” “lower,” and the like are used in connection with the orientation of the disclosed drawings. Since the elements or components of the embodiments of the present invention may be located in various orientations, the directional terms are used for illustrative purposes, and are not intended to limit the present invention thereto.

In addition, a division of the configuration units in the present disclosure is intended for ease of description and divided only by the main function set for each configuration unit. That is, two or more of the configuration units to be described hereinafter may be combined into a single configuration unit or formed by two or more of divisions by function into more than a single configuration unit. Further, each of the configuration units to be described hereinafter may additionally perform a part or all the functions among functions set for other configuration units other than being responsible for the main function, and a part of the functions among the main functions set for each of the configuration units may be exclusively taken and certainly performed by other configuration units.

An antenna element described in the present disclosure may be a patch antenna or a microstrip antenna manufactured in a form of a transparent film. For example, the antenna element may be applied to electronic devices for high frequency or ultra-high frequency (e.g., 3G, 4G, 5G or more) mobile communication, Wi-Fi, Bluetooth, near field communication (NFC), global positioning system (GPS), and the like, but it is not limited thereto. Herein, the electronic device may include a mobile phone, a smart phone, a tablet, a laptop computer, a personal digital assistant (PDA), a portable multimedia player (PMP), a navigation device, an MP3 player, a digital camera, a wearable device and the like. The wearable device may include a wristwatch type, a wrist band type, a ring type, a belt type, a necklace type, an ankle band type, a thigh band type, a forearm band type wearable device or the like. However, the electronic device is not limited to the above-described example, and the wearable device is also not limited to the above-described example.

In the following drawings, two directions which are parallel to an upper surface of a dielectric layer and cross each other perpendicularly are defined as an x-direction and a y-direction, and a direction perpendicular to the upper surface of the dielectric layer is defined as a z-direction. For example, the x-direction may correspond to a width direction of the antenna element, the y-direction may correspond to a length direction of the antenna element, and the z-direction may correspond to a thickness direction of the antenna element.

Figure 2:
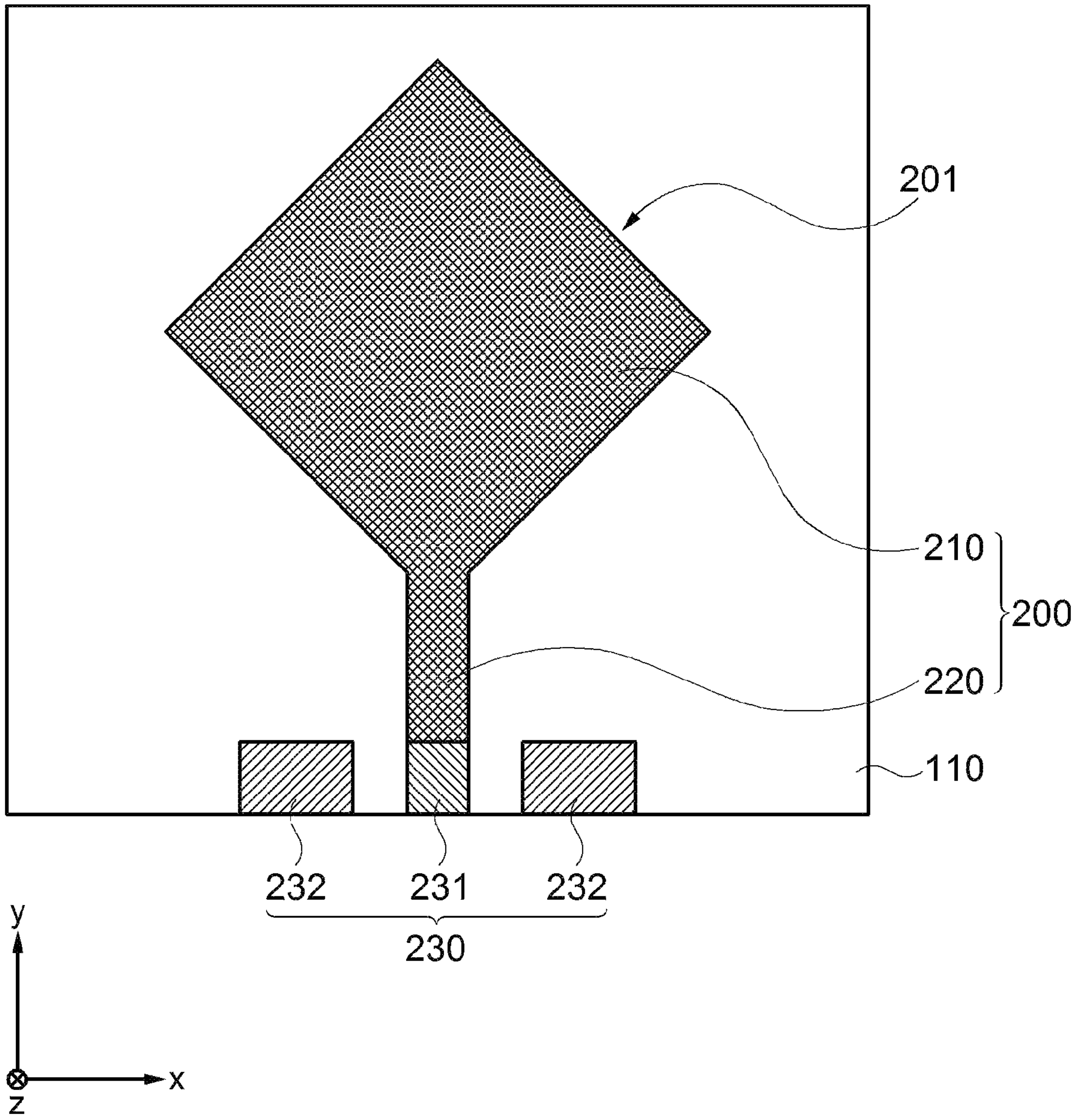
FIG. 2 is a schematic plan view illustrating the antenna device according to an embodiment.

FIG. 1 is a schematic cross-sectional view illustrating an antenna device according to an embodiment, and FIG. 2 is a schematic plan view illustrating the antenna device according to an embodiment.

Referring to FIGS. 1 and 2, the antenna device may include a dielectric layer 110 and an antenna conductive layer 120.

The dielectric layer 110 may include an insulation material having a predetermined dielectric constant. According to an embodiment, the dielectric layer 110 may include an inorganic insulation material such as glass, silicon oxide, silicon nitride, or metal oxide, or an organic insulation material such as an epoxy resin, an acrylic resin, or an imide resin. The dielectric layer 110 may function as a film substrate of the antenna device on which the antenna conductive layer 120 is formed.

The dielectric layer 110 may include e.g., a transparent resin film such as a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, cyclic polyolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

According to an embodiment, an adhesive film such as an optically clear adhesive (OCA), an optically clear resin (OCR), and the like may also be included in the dielectric layer 110.

According to an embodiment, the dielectric layer 110 may be formed in a substantial single layer, or may be formed in a multilayer structure of two or more layers.

Capacitance or inductance may be generated by the dielectric layer 110, thus to adjust a frequency band which can be driven or sensed by the antenna device. When the dielectric constant of the dielectric layer 110 exceeds about 12, a driving frequency is excessively reduced, such that driving of the antenna in a desired high frequency band may not be implemented. Therefore, according to an embodiment, the dielectric constant of the dielectric layer 110 may be adjusted in a range of about 1.5 to 12, and preferably about 2 to 12.

According to an embodiment, an insulation layer (e.g., an encapsulation layer, a passivation layer, etc. of a display panel) inside the display device on which the antenna device is mounted may be provided as the dielectric layer 110.

The antenna conductive layer 120 is formed on the dielectric layer 110, and may include an antenna unit 200 including a radiator 210 and a transmission line 220, and a pad electrode 230.

The antenna unit 200 may include a low resistance metal such as silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy including at least one thereof. These may be used alone or in combination of two or more thereof. For example, the antenna unit 200 may include silver (Ag) or a silver alloy (e.g., a silver-palladium-copper (APC) alloy) to implement a low resistance. As another example, the antenna unit 200 may include copper (Cu) or a copper alloy (e.g., a copper-calcium (CuCa) alloy) in consideration of low resistance and fine line width patterning.

According to an embodiment, the antenna unit 200 may include a transparent conductive oxide such as indium tin oxide (ITO), indium zinc oxide (IZO), indium zinc tin oxide (IZTO), zinc oxide (ZnOx), or copper oxide (CuO).

According to an embodiment, the antenna unit 200 may be formed in a single layer structure of a metal layer or in a lamination structure of a transparent conductive oxide layer and a metal layer. For example, the antenna unit 200 may have a two-layer structure of transparent conductive oxide layer-metal layer or a three-layer structure of transparent conductive oxide layer-metal layer-transparent conductive oxide. In this case, resistance may be reduced to improve signal transmission speed while improving flexible properties by the above-described metal layer, and corrosion resistance and transparency may be improved by the above-described transparent conductive oxide layer.

According to an exemplary embodiment, the antenna unit 200 may include a blackening processing part. Accordingly, reflectance on a surface of the antenna unit 200 may be decreased, thereby reducing the pattern from being viewed due to light reflection.

According to an embodiment, the surface of the metal layer included in the antenna unit 200 is converted into metal oxide or metal sulfide to form a blackened layer. According to an embodiment, the blackened layer such as a black material coating layer or a plating layer may be formed on the antenna unit 200 or the metal layer. Herein, the black material coating layer or plating layer may include silicon, carbon, copper, molybdenum, tin, chromium, molybdenum, nickel, cobalt, or oxide, sulfide, or an alloy containing at least one of them.

The composition and thickness of the blackened layer may be adjusted in consideration of an effect of reducing reflectance.

The radiator 210 may transmit a signal to an outside or receive a signal from the outside. For example, the radiator 210 may transmit/receive a signal at a resonance frequency. A y-direction length and an x-direction width of the radiator 210 may be determined depending on the desired resonance frequency, radiation resistance, and gain thereof.

The radiator 210 may be formed in a mesh structure defined by a plurality of conductive lines. Thereby, transmittance of the radiator 210 may be increased, and flexibility of the antenna device may be improved. Therefore, the antenna device may be effectively applied to a flexible display device.

According to an embodiment, as shown in FIG. 2, the radiator 210 may be implemented in a rhombus shape. However, this is only an example and there is no particular limitation on the shape of the radiator 210. That is, the radiator 210 may be implemented in various shapes such as a rectangle, circle and the like.

The transmission line 220 may be disposed between the radiator 210 and a signal pad 231 of the pad electrode 230 to electrically connect the radiator 210 and the signal pad 231. For example, the transmission line 220 may be branched from a central portion of the radiator 210 and connected to the signal pad 231.

The transmission line 220 may be formed in a mesh structure defined by a plurality of conductive lines. For example, the transmission line 220 may be formed in a mesh structure having substantially the same shape (e.g., the same line width, the same interval, etc.) as the radiator 210.

The x-direction width of the transmission line 220 may be determined in consideration of an x-direction width of a unit cell forming the mesh structure. For example, the x-direction width of the transmission line 220 may be an integer multiple of the x-direction width of the unit cell forming the mesh structure, and may be within an allowable error range. More preferably, the x-direction width of the transmission line 220 is an integer multiple of the x-direction width of the unit cell.

A mesh structure has higher electrical conductivity as the number of intersections (e.g., dotted circle portions in FIGS. 3 and 4) of the plurality of conductive lines is increased. Accordingly, by forming the x-direction width of the transmission line 220 to be an integer multiple of the x-direction width of the unit cell so that the transmission line 220 can include such intersections as many as possible, signal loss in the transmission line 220 may be prevented.

The x-direction width of the transmission line 220 will be described in detail below with reference to FIGS. 3 and 4.

According to an embodiment, the transmission line 220 may include substantially the same conductive material as the radiator 210. In addition, the transmission line 220 may be integrally connected with the radiator 210 to be provided as a substantially single member, or may be provided as a separate member from the radiator 210.

Meanwhile, as shown in FIG. 2, the radiator 210 and the transmission line 220 may include an edge conductive line 201 formed on edge portions of the radiator 210 and the transmission line 220, but it is not limited thereto. That is, the edge conductive line 201 may not be formed on the edge portion(s) of the radiator 210 and/or the transmission line 220. For example, as will be described below, a dummy pattern may be disposed around the radiator 210 and the transmission line 220, and the radiator 210 and the transmission line 220 may be segmented from the dummy pattern to form edges without the separate edge conductive line 201.

The pad electrode 230 may include a signal pad 231 and ground pads 232.

The signal pad 231 may be connected to an end of the transmission line 220, thus to be electrically connected with the radiator 210 through the transmission line 220. Thereby, the signal pad 231 may electrically connect a driving circuit unit (e.g., an integrated circuit (IC), etc.) and the radiator 210. For example, a circuit board such as a flexible printed circuit board (FPCB) may be bonded to the signal pad 231, and the driving circuit unit may be mounted on the circuit board. Accordingly, the radiator 210 and the driving circuit unit may be electrically connected with each other.

The ground pads 232 may be disposed around the signal pad 231 so as to be electrically and physically separated from the signal pad 231. For example, a pair of ground pads 232 may be disposed to face each other with the signal pad 231 interposed therebetween.

According to an embodiment, the signal pad 231 and the ground pad 232 may be formed in a solid structure including the above-described metal or alloy to reduce signal resistance. In this case, the signal pad 231 and the ground pad 232 may be formed in a multilayer structure including the above-described metal or alloy layer and the transparent conductive oxide layer.

According to an embodiment, the antenna device may further include a ground layer 105. Since the antenna device includes the ground layer 105, vertical radiation characteristics may be implemented.

The ground layer 105 may be formed on a lower surface of the dielectric layer 110. The ground layer 105 may be disposed so as to be entirely or partially overlapped with the antenna conductive layer 120 with the dielectric layer 110 interposed therebetween. For example, the ground layer 105 may be overlapped with the radiator of the antenna conductive layer 120.

According to an embodiment, a conductive member of the display device or display panel on which the antenna device is mounted may be provided as the ground layer 105. For example, the conductive member may include electrodes or wirings such as a gate electrode, source/drain electrodes, pixel electrode, common electrode, data line, scan line, etc. of a thin film transistor (TFT) included in the display panel, and a stainless steel (SUS) plate, heat radiation sheet, digitizer, electromagnetic shielding layer, pressure sensor, fingerprint sensor, etc. of the display device.

Meanwhile, for the convenience of description, FIG. 2 shows only one antenna device, a plurality of antenna devices may be arranged on the dielectric layer 110 in an array form. The arrangement form of the antenna devices may include a linear arrangement or non-linear arrangement.

Figure 3:
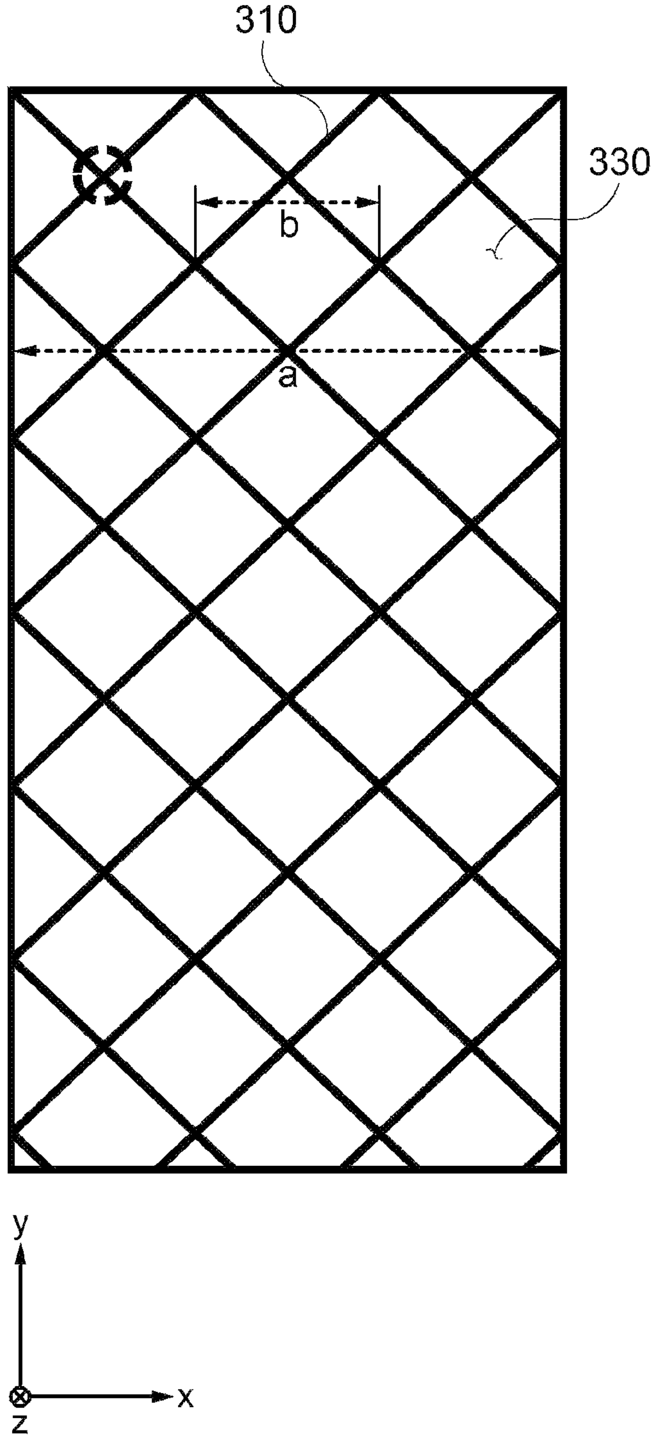
FIGS. 3 and 4 are views for describing an x-direction width of a transmission line.
Figure 4:
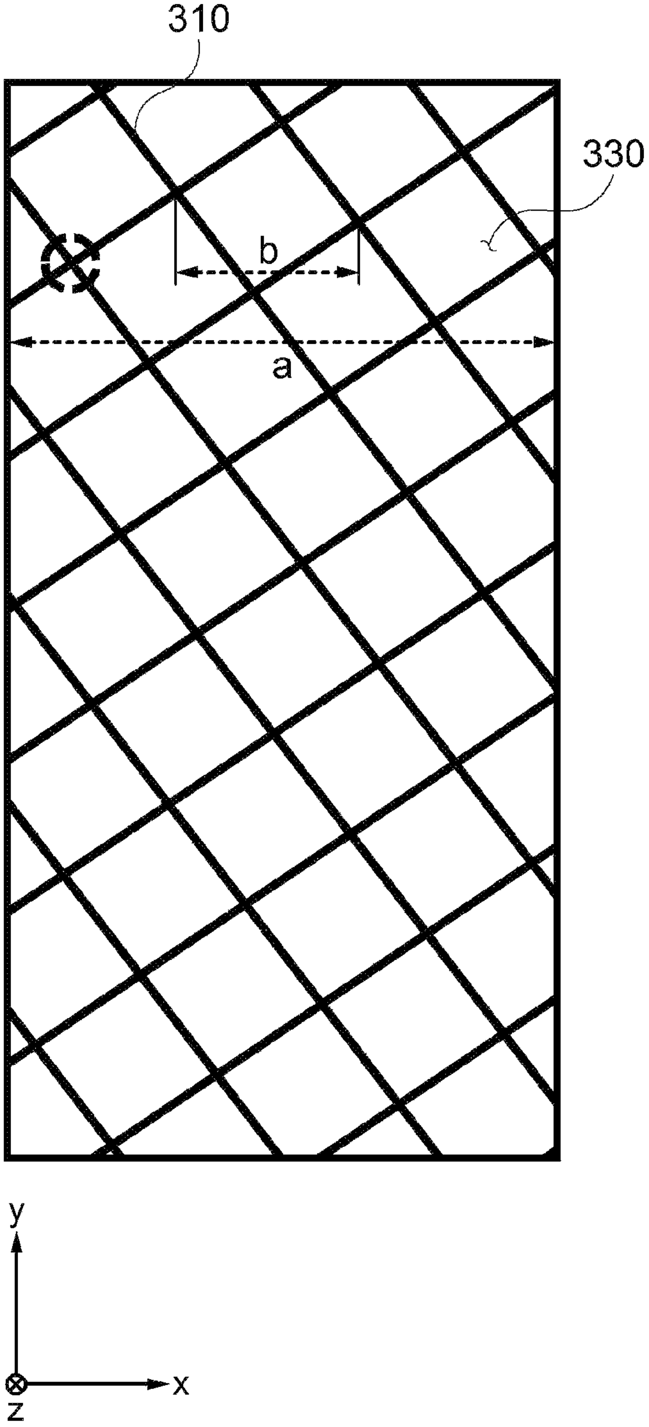

FIGS. 3 and 4 are views for describing the x-direction width of the transmission line. Specifically, FIG. 3 shows a case where an inclination angle with respect to the y-direction of the unit cell is 0, and FIG. 4 shows a case where the inclination angle of the unit cell with respect to the y-direction is not 0.

Referring to FIGS. 2 to 4, the mesh structure forming the radiator 210 and the transmission line 220 may be formed by a plurality of conductive lines 310 intersecting each other.

The mesh structure includes unit cells 330 defined as the plurality of conductive lines 310 substantially intersect in a honeycomb shape, and the plurality of unit cells 330 may be assembled to define the mesh structure.

According to an embodiment, the unit cell 330 may have a substantially rhombus shape.

As described above, an x-direction width a of the transmission line 220 may be determined in consideration of an x-direction width b of the unit cell 330 forming the mesh structure. For example, the x-direction width a of the transmission line 220 is an integer multiple of the x-direction width b of the unit cell 330 forming the mesh structure, and may be within an allowable error range.

More specifically, the x-direction width a of the transmission line 220 may be determined in a range satisfying Equation 1 below.

$$(n-0.2)\times b \leq a \leq (n+0.2)\times b \quad \text{[Equation 1]}$$

Wherein, n may be an integer, b may be a width of the unit cell 330, and a may be the width of the transmission line 220. In addition, 0.2 may be a value for setting the allowable error range in consideration of a process error.

More preferably, the x-direction width a of the transmission line 220 may be an integer multiple of the x-direction width b of the unit cells 330 forming the mesh structure.

More specifically, the x-direction width a of the transmission line 220 may be determined so as to satisfy Equation 2 below.

$$a=n\times b \quad \text{[Equation 2]}$$

According to an embodiment, by determining the x-direction width a of the transmission line 220 so as to satisfy the above-described Equation 1, and more preferably Equation 2, signal loss in the transmission line 220 where a flow of current is concentrated during supplying a power may be prevented, and thereby antenna gain may be improved.

Figure 5:
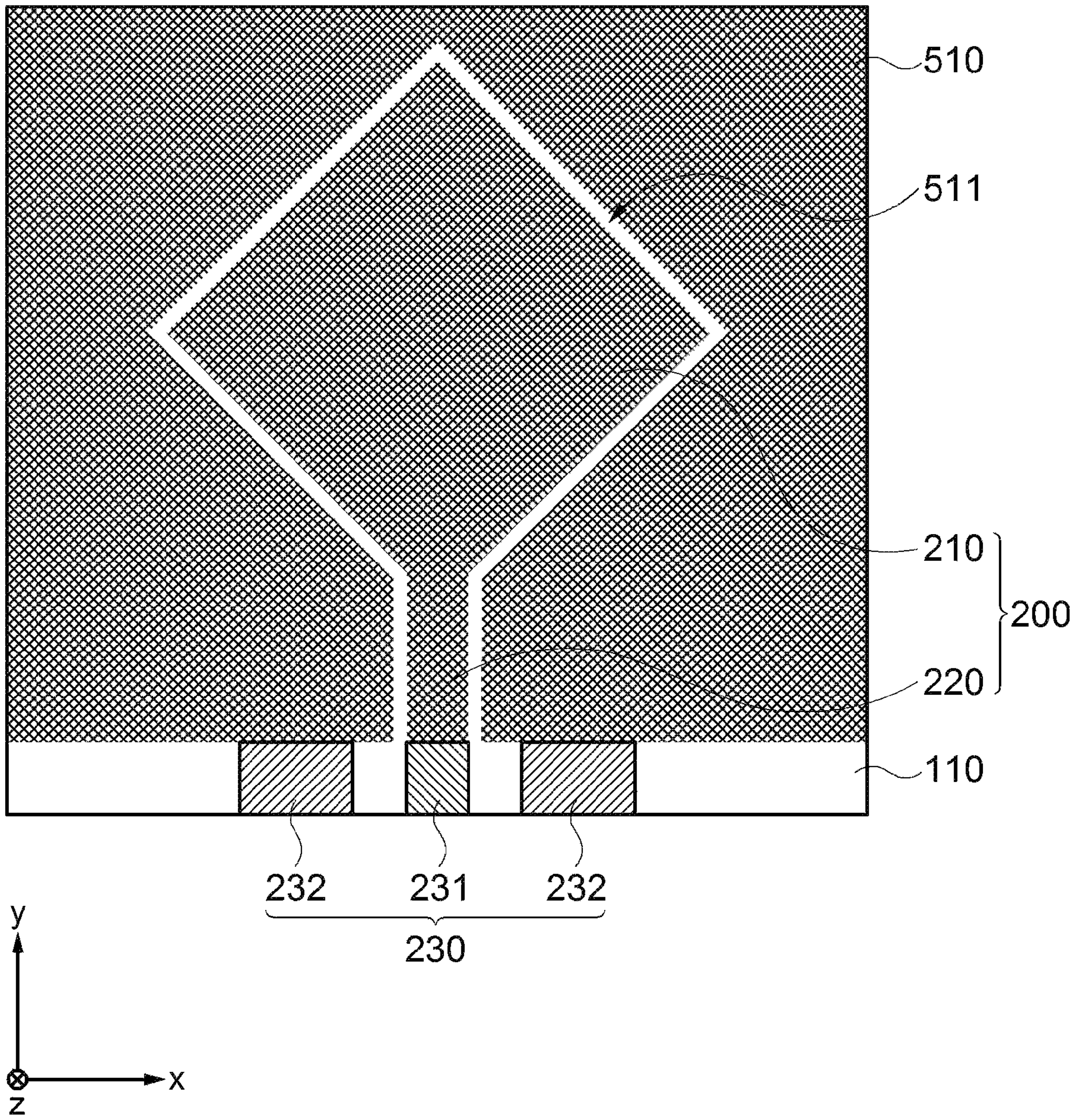
FIG. 5 is a schematic plan view illustrating an antenna device according to another embodiment.

FIG. 5 is a schematic plan view illustrating an antenna device according to another embodiment.

Referring to FIGS. 1 and 5, the antenna device may include an antenna conductive layer 120 formed on the dielectric layer 110, and the antenna conductive layer 120 may include an antenna unit 200 including a radiator 210 and a transmission line 220, a pad electrode 230 and a dummy pattern 510. Herein, the radiator 210, the transmission line 220, and the pad electrode 230 are the same as those of the configurations described with reference to FIGS. 1 to 4, therefore the same configurations will not be described in detail.

The dummy pattern 510 may be arranged around the antenna unit 200 including the radiator 210 and the transmission line 220.

The dummy pattern 510 may be formed in a mesh structure having substantially the same shape (e.g., the same line width and the same interval, etc.) as the radiator 210 or the transmission line 220, and may include the same metal as the radiator 210 or the transmission line 220. According to an embodiment, a portion of the conductive line forming the dummy pattern 510 may be segmented.

The dummy pattern 510 may be disposed so as to be electrically and physically separated from the antenna unit 200 and the pad electrode 230. For example, a separation region 511 may be formed along a side line or contour of the antenna unit 200 to separate the dummy pattern 510 and the antenna unit 200 from each other. That is, the dummy pattern 510 may be disposed around the antenna unit 200, and the antenna unit 200 and the dummy pattern 510 may be segmented from each other to form the separation region 511. Accordingly, the antenna unit 200 may form edges without a separate edge conductive line.

As described above, by arranging the dummy pattern 510 having the mesh structure substantially the same as the radiator 210 or the transmission line 220 around the antenna unit 200, it is possible to prevent the antenna unit from being viewed by a user of the display device on which the antenna device is mounted.

Meanwhile, for the convenience of description, FIG. 5 shows only one antenna unit, a plurality of antenna units may be arranged on the dielectric layer 110 in an array form. The arrangement form of the antenna device may include a linear arrangement or non-linear arrangement.

Figure 6:
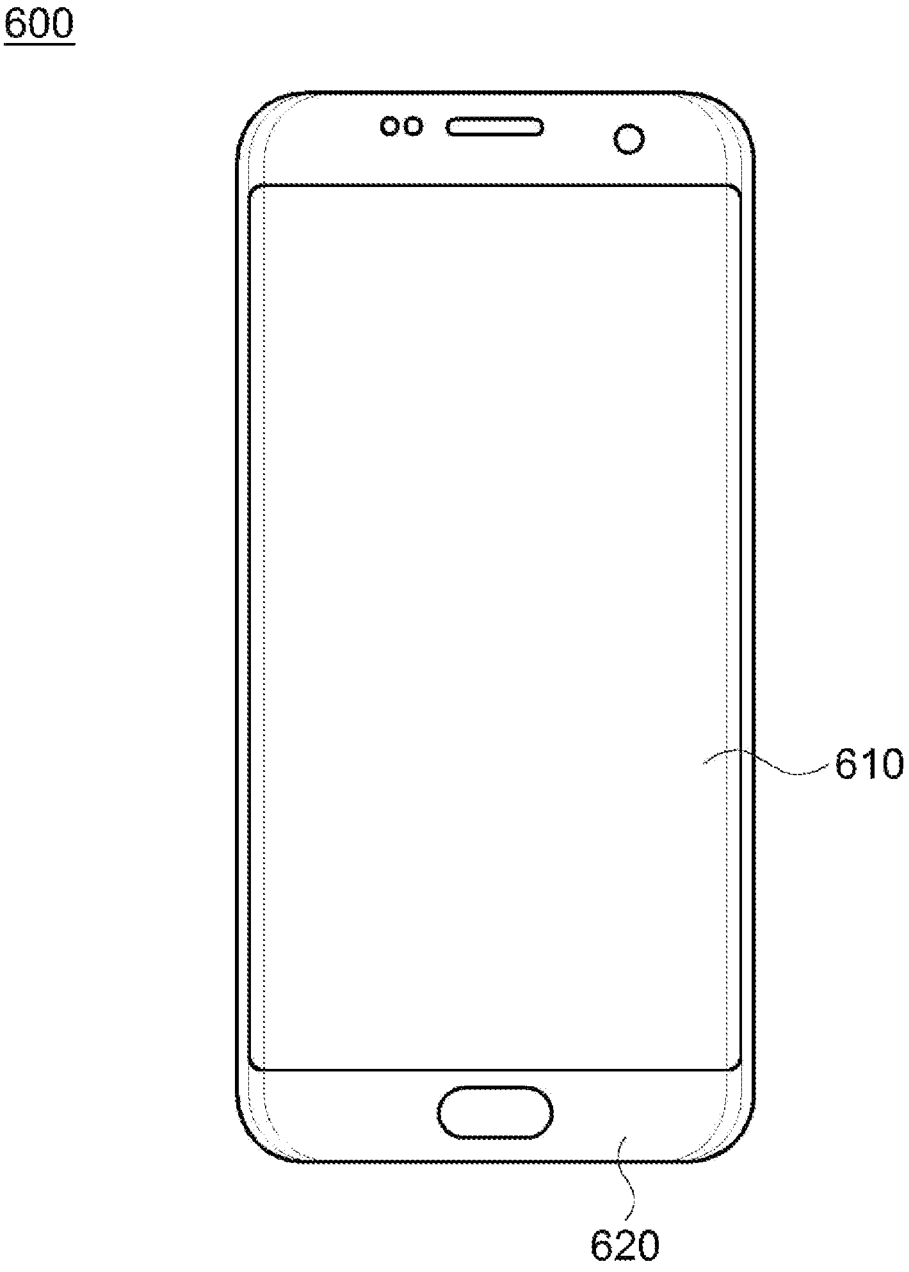
FIG. 6 is a schematic plan view for describing a display device according to an embodiment.

FIG. 6 is a schematic plan view for describing a display device according to an embodiment. More specifically, FIG. 6 is a view illustrating an external shape including a window of the display device.

Referring to FIG. 6, the display device 600 may include a display region 610 and a peripheral region 620. The display region 610 may indicate a region in which visual information is displayed, and the peripheral region 620 may indicate an opaque region disposed on both sides and/or both ends of the display region 610. For example, the peripheral region 620 may correspond to a light-shielding part or a bezel part of the display device 600.

According to an embodiment, the above-described antenna device may be mounted on the display device 600. For example, the antenna unit 200 of the antenna device may be disposed so as to at least partially correspond to the display region 610 of the display device 600, and the pad electrode 230 may be disposed so as to correspond to the peripheral region 620 of the display device 600. In this case, the antenna unit 200, in particular, a portion of the transmission line 220 may be disposed so as to correspond to the peripheral region 620 of the display device 600.

A driving circuit such as an IC chip of the display device 600 and/or the antenna device may be disposed in the peripheral region 620.

By disposing the pad electrode 230 of the antenna device so as to be adjacent to the driving circuit, signal loss may be suppressed by shortening a path for transmitting and receiving signals.

When the antenna device includes the dummy pattern 510, the dummy pattern 510 may be disposed so as to at least partially correspond to the display region 610 of the display device 600.

The antenna device includes the antenna unit and/or the dummy pattern, which are formed in a mesh structure, such that it is possible to significantly reduce or suppress the patterns from being viewed while improving the transmittance. Accordingly, image quality in the display region 610 may also be improved while maintaining or improving desired communication reliability.

The present invention has been described with reference to the preferred embodiments above, and it will be understood by those skilled in the art that various modifications may be made within the scope without departing from essential characteristics of the present invention.

Accordingly, it should be interpreted that the scope of the present invention is not limited to the above-described embodiments, and other various embodiments within the scope equivalent to those described in the claims are included within the present invention.

Experimental Example 1

Figure 7:
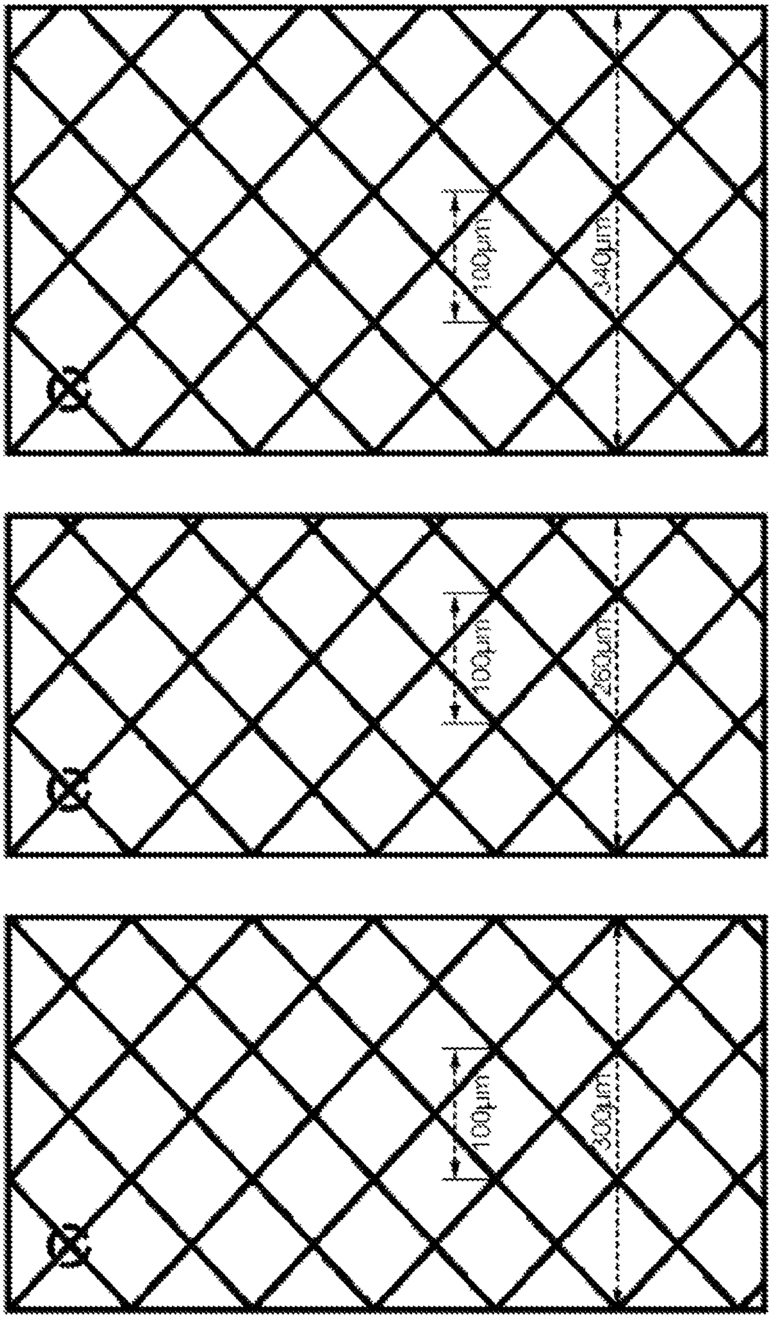
FIG. 7 is views illustrating transmission lines according to Experimental Example 1.

According to the design shown in FIGS. 2 and 7, 1×2 array antennas were formed in a mesh structure in which an inclination angle of the unit cell is 0. Specifically, an antenna unit having a mesh structure was formed on an upper surface of a glass (0.7 T) dielectric layer using an alloy (APC) of silver (Ag), palladium (Pd) and copper (Cu), and then APC was deposited on a lower surface of the dielectric layer to form a ground layer. Conductive lines included in the mesh structure were formed so as to have a line width of 3 μm, a thickness (or height) of 2000 Å, and a distance between the conductive lines and the ground layer of 380 μm. A width of a unit cell was fixed to 100 μm, and widths of the transmission line were set to be 300 μm, 260 μm and 340 μm, respectively, to form antenna units of Example 1, Comparative Example 1 and Comparative Example 2, followed by measuring antenna gains thereof at 28 GHz. The obtained measurement results are shown in Table 1 below.

TABLE 1

| | Ratio of transmission line width to unit cell width (a/b) | Gain (dBi) @ 28 GHz |
|---|---|---|
| Example 1 | 3 | 3.12 |
| Comparative Example 1 | 2.6 | 2.71 |
| Comparative Example 2 | 3.4 | 2.92 |

Referring to FIG. 7 and Table 1, it can be seen that, in the case of the antenna units of Comparative Examples 1 and 2, in which a ratio of the transmission line width to the unit cell width is 2.6 and 3.4, the antenna gains are 2.71 and 2.92, respectively, whereas in the case of the antenna unit of Example 1, in which the ratio of the transmission line width to the unit cell width is an integer of 3, the antenna gain is 3.12.

In addition, it can be seen that the antenna units of Example 1 and Comparative Example 2 have the same number of intersections (dotted line portions in FIG. 7) included in the transmission line, but the antenna unit of Comparative Example 2 has a larger area occupied by the transmission line and a smaller antenna gain than the antenna unit of Example 1.

Further, it can be confirmed that, by forming the width of the transmission line to be an integer multiple of the width of the unit cell, signal loss in the transmission line may be prevented and the antenna gain may be improved.

Experimental Example 2

Figure 8:
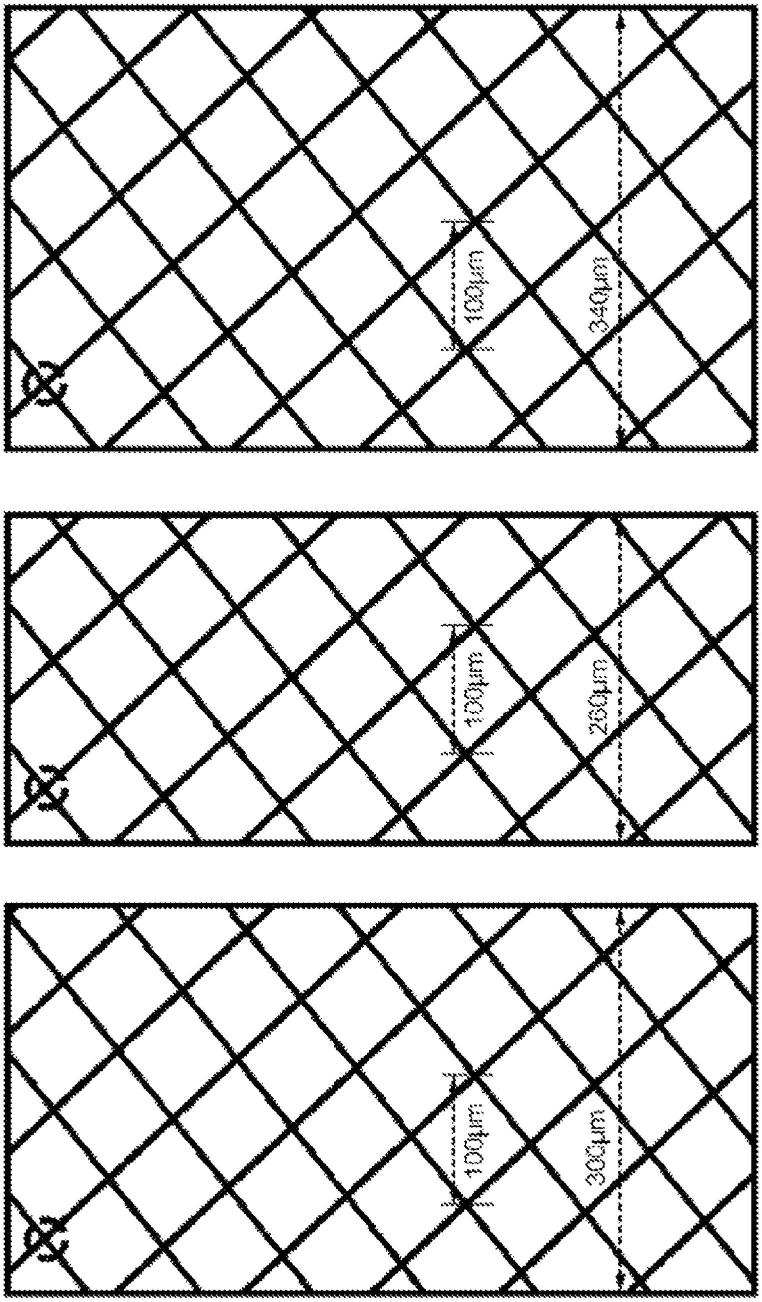
FIG. 8 is views illustrating transmission lines according to Experimental Example 2.

According to the design shown in FIGS. 2 and 8, 1×2 array antennas were formed in a mesh structure in which an inclination angle of the unit cell is 4. Specifically, an antenna unit having a mesh structure was formed on an upper surface of a glass (0.7 T) dielectric layer using an alloy (APC) of silver (Ag), palladium (Pd) and copper (Cu), and then APC was deposited on a lower surface of the dielectric layer to form a ground layer. Conductive lines included in the mesh structure were formed so as to have a line width of 3 μm, a thickness (or height) of 2000 Å, and a distance between the conductive lines and the ground layer of 380 μm. A width of a unit cell was fixed to 100 μm, and widths of the transmission line were set to be 300 μm, 260 μm and 340 μm, respectively, to form antenna units of Example 2, Comparative Example 3 and Comparative Example 4, followed by measuring antenna gains thereof at 28 GHZ. The obtained measurement results are shown in Table 2 below.

TABLE 2

| | Ratio of transmission line width to unit cell width (a/b) | Gain (dBi) @ 28 GHz |
|---|---|---|
| Example 2 | 3 | 2.67 |
| Comparative Example 3 | 2.6 | 2.22 |
| Comparative Example 4 | 3.4 | 2.50 |

Referring to FIG. 8 and Table 2, it can be seen that, in the case of the antenna units of Comparative Examples 3 and 4, in which a ratio of the transmission line width to the unit cell width is 2.6 and 3.4, the antenna gains are 2.22 and 2.50, respectively, whereas in the case of the antenna unit of Example 2, in which the ratio of the transmission line width to the unit cell width is an integer of 3, the antenna gain is 2.67.

In addition, it can be seen that the antenna unit of Comparative Example 4 has the number of intersections (dotted line portions in FIG. 7) included in the transmission line larger than the antenna unit of Example 2, but the antenna unit of Comparative Example 4 has a larger area occupied by the transmission line and a smaller antenna gain than the antenna unit of Example 2.

Further, it can be confirmed that, by forming the width of the transmission line to be an integer multiple of the width of the unit cell, signal loss in the transmission line may be prevented and the antenna gain may be improved.

What is claimed is:

1. An antenna device comprising:

a dielectric layer;

a radiator formed on the dielectric layer; and a transmission line connected to the radiator on the dielectric layer and formed in a mesh structure which is a set of unit cells defined by a plurality of conductive lines, wherein a width of the transmission line satisfies 2.8≤a/b≤3.2, wherein b is the width of the unit cell, and a is the width of the transmission line, and the radiator and the unit cell have a rhombus shape.

2. The antenna device according to claim 1, further comprising:

a signal pad connected to an end of the transmission line; and a ground pad disposed around the signal pad so as to be separated from the signal pad.

3. The antenna device according to claim 2, wherein the signal pad or the ground pad is formed in a solid structure.

4. The antenna device according to claim 2, wherein the ground pad comprises a pair of ground pads facing each other with the signal pad interposed therebetween.

5. The antenna device according to claim 1, further comprising a dummy pattern disposed around the radiator and the transmission line on the dielectric layer with being electrically separated from the radiator and the transmission line.

6. The antenna device according to claim 5, wherein the radiator and the dummy pattern are formed in a mesh structure.

7. The antenna device according to claim 1, further comprising a ground layer formed on a lower surface of the dielectric layer.

8. A display device comprising the antenna device according to claim 1.

* * * * *